US009258248B2

(12) United States Patent
Andrews et al.

(10) Patent No.: US 9,258,248 B2
(45) Date of Patent: *Feb. 9, 2016

(54) ENERGY-EFFICIENT NETWORK DEVICE WITH COORDINATED SCHEDULING AND PROCESSOR RATE CONTROL

(75) Inventors: Daniel Matthew Andrews, Chatham, NJ (US); Spyridon Antonakopoulos, New Providence, NJ (US); Yihao Zhang, Chatham, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1256 days.

This patent is subject to a terminal disclaimer.

(21) Appl. No.: 13/078,599

(22) Filed: Apr. 1, 2011

(65) Prior Publication Data

US 2012/0250571 A1  Oct. 4, 2012

(51) Int. Cl.
*H04L 12/863* (2013.01)

(52) U.S. Cl.
CPC .................................. *H04L 47/627* (2013.01)

(58) Field of Classification Search
None
See application file for complete search history.

(56) References Cited

U.S. PATENT DOCUMENTS

| | | | | |
|---|---|---|---|---|
| 6,957,267 B2* | 10/2005 | Awasthi | | 709/232 |
| 7,012,889 B1* | 3/2006 | Turner et al. | | 370/229 |
| 7,398,414 B2* | 7/2008 | Sherburne, Jr. | | 713/600 |
| 7,558,278 B2* | 7/2009 | Shi et al. | | 370/412 |
| 8,554,894 B2* | 10/2013 | Andrews et al. | | 709/223 |
| 2001/0033581 A1* | 10/2001 | Kawarai et al. | | 370/468 |
| 2003/0137945 A1 | 7/2003 | Yavatkar et al. | | |
| 2004/0128379 A1* | 7/2004 | Mizell et al. | | 709/224 |
| 2004/0163000 A1* | 8/2004 | Kuhlmann et al. | | 713/300 |
| 2005/0169257 A1* | 8/2005 | Lahetkangas et al. | | 370/389 |
| 2008/0256146 A1* | 10/2008 | Nishizawa et al. | | 707/204 |
| 2013/0003546 A1* | 1/2013 | Matthews et al. | | 370/231 |
| 2013/0243009 A1* | 9/2013 | Andrews et al. | | 370/429 |

OTHER PUBLICATIONS

J-Y. Le Boudec et al., "Network Calculus, A Theory of Deterministic Queuing Systems for the Internet," http://ica1www.epfl.ch/PS_files/NetCal.htm, May 10, 2004, 265 pages.

M. Andrews et al., "Universal-Stability Results and Performance Bounds for Greedy Contention-Resolution Protocols," Journal of the ACM, Jan. 2001, pp. 39-69, vol. 48, No. 1.

M. Andrews et al., "Routing and Scheduling for Energy and Delay Minimization in the Powerdown Model," Proceedings of IEEE INFOCOM, Mar. 2010, 5 pages.

(Continued)

*Primary Examiner* — Hassan Kizou
*Assistant Examiner* — Roberta A Shand
(74) *Attorney, Agent, or Firm* — Ryan, Mason & Lewis, LLP (57) ABSTRACT

A network device of a communication network is configured to implement coordinated scheduling and processor rate control. In one aspect, packets are received in the network device and scheduled for processing from one or more queues of that device. An operating rate of a processor of the network device is controlled based at least in part on at least one of an arrival rate of the packets and a number of the packets stored in the one or more queues. As one example of processor rate control based on packet arrival rate, the operating rate of the processor may be controlled by accumulating a designated number of the received packets, determining an average arrival rate of the accumulated packets, and setting the operating rate of the processor based on the average arrival rate.

22 Claims, 3 Drawing Sheets

(56) References Cited

OTHER PUBLICATIONS

M. Andrews et al., "The Effects of Temporary Sessions on Network Performance," Proceedings of the 11th Annual ACM-SIAM Symposium on Discrete Algorithms (SODA), Jan. 2000, pp. 448-457.

N. Bansal et al., "Speed Scaling with an Arbitrary Power Function," Proceedings of the 20th Annual ACM-SIAM Symposium on Discrete Algorithms (SODA), Jan. 2009, pp. 693-701.

N. Bansal et al., "Speed Scaling to Manage Energy and Temperature," Journal of the ACM, Mar. 2007, 39 pp., vol. 54, No. 1, Article 3.

F. Yao et al., A Scheduling Model for Reduced CPU Energy, Proceedings of the 36th Annual Symposium on Foundations of Computer Science (FOCS), Oct. 1995, pp. 374-382.

H.L. Chan et al., "Energy Efficient Online Deadline Scheduling," Proceedings of the 18th Annual ACM-SIAM Symposium on Discrete Algorithms (SODA), 2007, pp. 795-804.

A. Demers et al., "Analysis and Simulation of a Fair Queueing Algorithm," Journal of Internetworking: Research and Experience, Sep. 1990, pp. 3-26, vol. 1, No. 1.

"Enhanced Intel SpeedStep Technology for the Intel Pentium M Processor," Intel White Paper, Mar. 2004, Order No. 301170-001, 12 pages.

M. Gupta et al., "Greening of the Internet," SIGCOMM, Proceedings of the ACM Conference on Applications, Technologies, Architectures, and Protocols for Computer Communications, Aug. 2003, pp. 19-26.

S. Irani et al., "Algorithmic Problems in Power Management," SIGACT News, Jun. 2005, pp. 63-76, vol. 36, No. 2.

S. Nedevschi et al., "Reducing Network Energy Consumption via Sleeping and Rate-Adaptation," USENIX Association, NSDI '08: 5th USENIX Symposium on Networked Systems Design and Implementation, Apr. 2008, pp. 323-336.

A.K. Parekh et al., "A Generalized Processor Sharing Approach to Flow Control in Integrated Services Networks: The Single-Node Case," IEEE/ACM Transactions on Networking, Jun. 1993, pp. 344-357, vol. 1, No. 3.

A.K. Parekh et al., "A Generalized Processor Sharing Approach to Flow Control in Integrated Services Networks: The Multiple Node Case," IEEE/ACM Transactions on Networking, Apr. 1994, pp. 137-150, vol. 2, No. 2.

A. Wierman et al., "Power-Aware Speed Scaling in Processor Sharing Systems," IEEE INFOCOM, Apr. 2009, pp. 2007-2015.

U.S. Appl. No. 12/723,116, filed in the name of D.M. Andrews et al. on Mar. 12, 2010 and entitled "Network Scheduling for Energy Efficiency."

\* cited by examiner

ARRIVAL CURVE

ENERGY-EFFICIENT NETWORK DEVICE WITH COORDINATED SCHEDULING AND PROCESSOR RATE CONTROL

STATEMENT REGARDING FEDERALLY SPONSORED RESEARCH OR DEVELOPMENT

This invention was made with government support under Contract No. DE-EE0002887 awarded by the U.S. Department of Energy (DOE). The government has certain rights in the invention.

FIELD OF THE INVENTION

The present invention relates generally to communication networks, and more particularly to techniques for processing packets in network devices of a communication network.

BACKGROUND OF THE INVENTION

U.S. telecommunication infrastructure is estimated to consume 60 billion kilowatt hours of power per year. Such an enormous consumption partially results from the fact that most networks are engineered to handle peak traffic. Network devices such as routers and switches tend to operate at full speed and consume maximum power, while typical traffic levels are only a small fraction of the maximum throughput.

One known approach to reducing energy consumption in a network involves powering down particular network devices from time to time. For example, these network devices may be placed into a sleep mode, an off state or other type of inactive state in which power consumption of the network device is considerably reduced relative to its maximum power consumption. However, during such downtime any packets arriving at the network device for processing have to be buffered, and this can cause significant delay in the transport of the packets through the network. Thus, minimizing the period of time that the network devices are in their respective active states and minimizing delays in packet transmission through the network become two conflicting goals. This problem is compounded by the fact that there is often a considerable transition time involved in switching a given network device between its active and inactive states.

In order to address the costs associated with transition of network devices between their active and inactive states, it has been proposed that edge routers of a network group packets having the same source and destination and transmit them in bursts, in order to reduce the number of transitions and increase the inactive time of the network devices. See S. Nedevschi et al., "Reducing Network Energy Consumption via Sleeping and Rate-Adaptation," in J. Crowcroft and M. Dahlin, eds., NSDI, pp. 323-336, USENIX Association, 2008. However, such an approach can still lead to considerable delay for packet transmission through the network, and fails to provide a global optimization that simultaneously addresses both energy consumption and delay minimization.

Improved techniques that simultaneously address both energy consumption and delay minimization are disclosed in U.S. patent application Ser. No. 12/723,116, filed Mar. 12, 2010 and entitled "Network Scheduling for Energy Efficiency," which is incorporated by reference herein. In one of the disclosed techniques, a communication network comprising a plurality of network devices is configured to implement scheduling for energy efficiency. More particularly, a set of network devices interconnected in a line within a network is identified, and a common frame size is established. For each of the network devices of the line, active and inactive periods for that network device are scheduled in a corresponding frame having the common frame size, with the frames in the respective network devices of the line being time shifted relative to one another by designated offsets. For each of one or more of the active periods of each of the network devices of the line, received packets are scheduled for processing in that network device. Such an arrangement improves the energy efficiency of a communication network by scheduling active and inactive periods for particular nodes of the network in a coordinated manner that minimizes the impact of transitions between active and inactive periods on packet delay.

Another issue that arises in a communication network relates to scheduling data packets for processing in a manner that ensures that queue length within a given network device remains bounded over time. Numerous scheduling algorithms have been developed that ensure bounded queue length. However, such scheduling algorithms generally assume that the network device processor always operates at its full rate whenever that network device is in an active state. Although this may be optimal for clearing queue backlogs as fast as possible, it is often suboptimal in terms of energy consumption, and therefore undermines the energy efficiency of the overall network.

SUMMARY OF THE INVENTION

Illustrative embodiments of the present invention provide coordinated scheduling and processor rate control techniques that significantly increase the energy efficiency of a communication network while also ensuring bounded queue lengths over time and minimizing packet delay through the network.

In one aspect, a network device of a communication network is configured to implement coordinated scheduling and processor rate control. In one aspect, packets are received in the network device and scheduled for processing from one or more queues of that device. An operating rate of a processor of the network device is controlled based at least in part on at least one of an arrival rate of the packets and a number of the packets stored in the one or more queues.

In an illustrative embodiment in which processor rate control is based on packet arrival rate, the operating rate of the processor may be controlled by accumulating a designated number of the received packets, determining an average arrival rate of the accumulated packets, and setting the operating rate of the processor based on the average arrival rate.

In an illustrative embodiment in which processor rate control is based on the number of packets stored in a given one of the queues, the operating rate of the processor may be controlled by determining if the queue is at or below a designated minimum fullness threshold, and if the queue is at or below the designated minimum fullness threshold, setting the processor operating rate to a first relatively low level, and subsequently increasing the processor operating rate from the first relatively low level to a second relatively high level.

In another illustrative embodiment in which processor rate control is based on the number of packets stored in a given one of the queues, the operating rate of the processor may be controlled by setting the operating rate of the processor as a designated function of the number of packets stored in the one or more queues.

The illustrative embodiments considerably improve the energy efficiency of a communication network by adaptively controlling processor operating rate based on one or more of packet arrival rate and queue length, and thus in coordination with scheduling of the packets for processing in a network device. This avoids the above-noted problems associated with conventional arrangements in which the network device processor always operates at its full rate whenever that network device is in an active state.

These and other features and advantages of the present invention will become more apparent from the accompanying drawings and the following detailed description.

DETAILED DESCRIPTION OF THE INVENTION

The invention will be described herein in conjunction with illustrative embodiments of communication networks, network devices and associated coordinated scheduling and rate adaptation processes. It should be understood, however, that the invention is not limited to use with the particular networks, devices and processes described, but is instead more generally applicable to any network application in which it is desirable to provide improved energy efficiency by coordinated scheduling and rate adaptation within each of a plurality of network devices.

Figure 1:
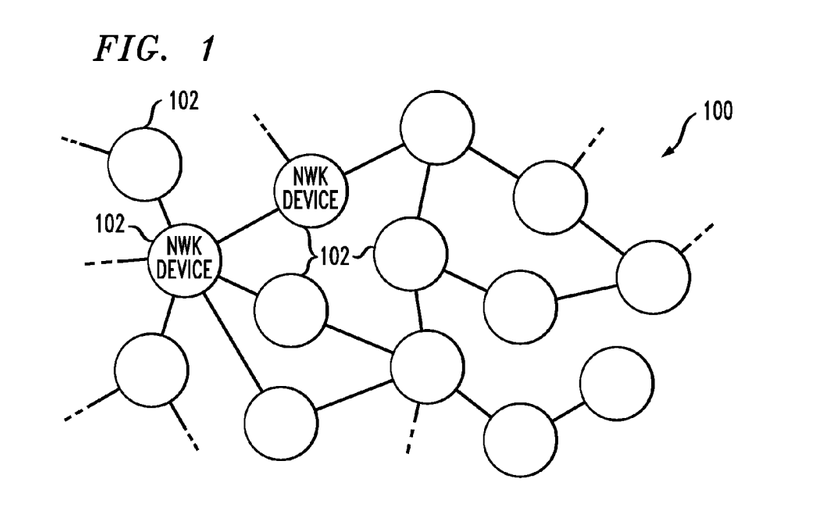
FIG. 1 shows a communication network in an illustrative embodiment of the invention.

FIG. 1 shows a communication network 100 comprising a plurality of interconnected network devices 102. The network devices 102 may comprise routers, switches, servers, computers or other processing devices, in any combination, examples of which may also be referred to herein as network nodes or terminals. A given network device will generally comprise a processor and a memory coupled to the processor, as well as a transceiver which allows the network device to communicate with the other network devices to which it is interconnected.

As will be described in greater detail below, one or more of the network devices 102 of the network 100 are configured to implement a coordinated scheduling and rate adaptation process that significantly increases the energy efficiency of the network device and thus of the communication network as a whole. The coordinated scheduling and rate adaptation process may be implemented in a combined scheduling and rate adaptation module provided within each of the network devices 102. In such an embodiment, the process is fully distributed, with each network device independently performing its associated scheduling and rate adaptation operations. In other embodiments, a centralized controller may be coupled to multiple network devices in order to facilitate the scheduling and rate adaptation operations of those devices. Embodiments of the invention may therefore be fully distributed, fully centralized, or may utilize a hybrid of distributed and centralized control.

The network 100 may comprise any type of communication network suitable for transporting data or other signals, and the invention is not limited in this regard. For example, portions of the network 100 may comprise a wide area network such as the Internet, a metropolitan area network, a local area network, a cable network, a telephone network, a satellite network, as well as portions or combinations of these or other networks. The term "network" as used herein is therefore intended to be broadly construed.

Figure 2:
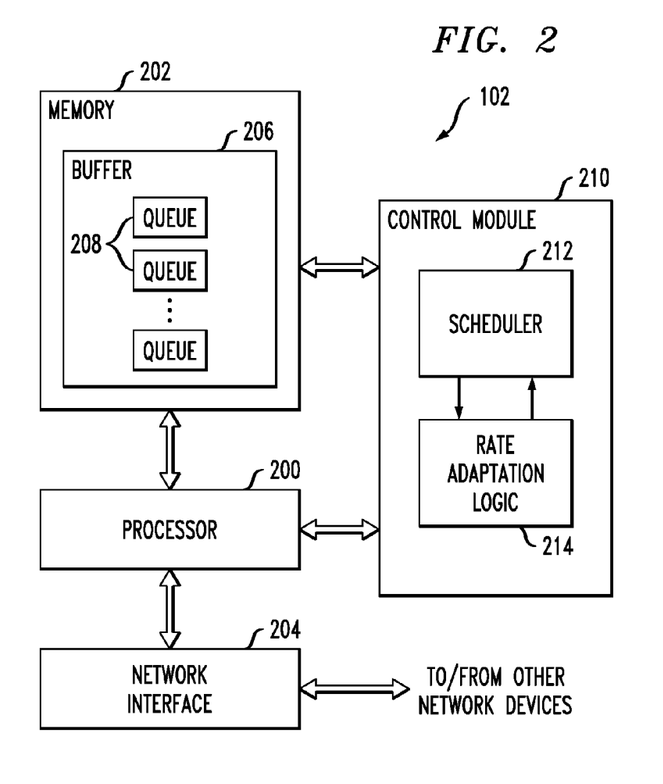
FIG. 2 is a more detailed view of a particular network device of the FIG. 1 network.

Referring now to FIG. 2, one possible implementation of a given network device 102 of the network 100 is shown. In this embodiment, the given network device 102 comprises a processor 200 coupled to a memory 202, and further comprises network interface circuitry 204. The memory 202 comprises a buffer 206 having a plurality of queues 208 for storing received packets to be transmitted or otherwise processed by the network device. It should be noted that the term "packet" as used herein is intended to be construed broadly, so as to encompass, for example, a wide variety of different types of protocol data units.

Also included in the network device is a control module 210 that in this embodiment is implemented as a combined scheduler and rate adaptation module. The control module 210 comprises a scheduler 212 coupled to rate adaptation logic 214. The control module in the present embodiment is configured to implement coordinated scheduling and processor rate control in which an operating rate of the processor 200 of the network device 102 is controlled based at least in part on at least one of an arrival rate of the packets in the device and a number of the packets stored in at least one of the queues 208. The operating rate may be controlled, for example, by adjusting a clock speed of the processor, or a service rate of the processor. The term "operating rate" is therefore intended to be broadly interpreted to encompass these and other arrangements.

The processor 200 may be implemented as a microprocessor, a microcontroller, an application-specific integrated circuit (ASIC) or other type of processing device, as well as portions or combinations of such devices. The memory 202 may comprise an electronic random access memory (RAM), a read-only memory (ROM), a disk-based memory, or other type of storage device, as well as portions or combinations of such devices. The processor and memory may be used in storage and execution of one or more software programs for performance of coordinated scheduling and rate adaptation operations within the network device. The control module 210 or portions thereof may therefore be implemented at least in part using such software programs.

The memory 202 is assumed to include in addition to buffer 206 one or more other storage areas, such as one or more storage areas that may be utilized for program code storage. The memory 202 may therefore be viewed as an example of what is more generally referred to herein as a computer program product or still more generally as a computer-readable storage medium that has executable program code embodied therein. Other examples of computer-readable storage media may include disks or other types of magnetic or optical media, in any combination.

The processor 200, memory 202 and interface circuitry 204 may comprise well-known conventional circuitry suitably modified to operate in the manner described herein. Conventional aspects of such circuitry are well known to those skilled in the art and therefore will not be described in detail herein.

It is to be appreciated that a network device as disclosed herein may be implemented using components and modules other than those specifically shown in the exemplary arrangement of FIG. 2.

The operation of the network devices 102 in illustrative embodiments will now be described with reference to FIGS. 3 through 5.

As indicated previously, conventional techniques for scheduling data packets for processing in a manner that ensures bounded queue length generally assume that the network device processor always operates at its full rate whenever that network device is in an active state. Such techniques are suboptimal in terms of energy consumption, and therefore undermine the energy efficiency of the overall network. In the illustrative embodiments to be described in conjunction with FIGS. 3 through 5, these and other drawbacks of conventional practice are overcome by a coordinated scheduling and rate adaptation process in which an operating rate of the processor 200 of the network device 102 is controlled based at least in part on at least one of an arrival rate of the packets in the device and a number of the packets stored in at least one of the queues 208. The use of coordinated scheduling and processor rate adaptation saves energy by slowing down the processors under low traffic load conditions while also maintaining desired properties such as bounded queue lengths over time and minimized packet delay through the network.

It will be assumed without limitation for the examples below that the operating rate of the processor 200 may be set to any value in the interval $[R_{min}, R_{max}]$, where $R_{min}$ and $R_{max}$ are the respective minimum and maximum operating rates of the processor, and where $0<R_{min}<R_{max}$.

Figure 3:
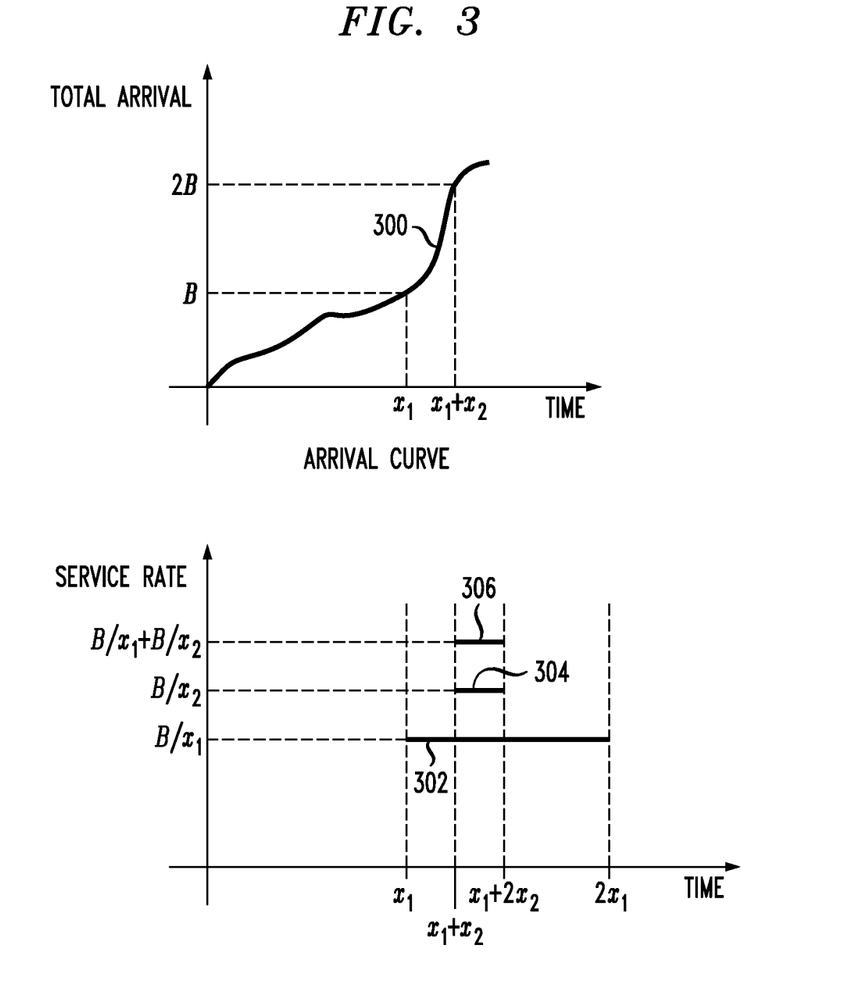
FIGS. 3, 4 and 5 illustrate examples of respective batch-based, slow-start and queue-based rate adaptation techniques that may be implemented by a combined scheduler and rate adaptation module in the network device of FIG. 2.

Referring now to FIG. 3, an illustrative embodiment is shown in which the operating rate of the processor 200 is controlled based on packet arrival rate. More particularly, in this embodiment, the operating rate of the processor 200 is controlled by accumulating a designated number of the received packets, determining an average arrival rate of the accumulated packets, and setting the operating rate of the processor 200 based on the average arrival rate. Such an arrangement is an example of what is also referred to herein as a batch-based rate adaptation technique.

The upper portion of FIG. 3 shows an arrival curve 300 of received packets. The arrival curve 300 is a plot of the number of packets received as a function of time. In this embodiment, an average arrival rate is determined by accumulating B packets and dividing by the time it took to accumulate those packets. For example, the arrival curve indicates that the first B packets are received over a time period of duration $x_1$ and thus the average arrival rate is determined as $B/x_1$. The operating rate of the processor, indicated in this example as a service rate in the lower portion of FIG. 3, is therefore set to $B/x_1$ for the time period between $x_1$ and $x_1+x_2$. This corresponds to the level denoted by reference numeral 302. Referring again to the upper portion of the figure, B additional packets are accumulated in the time period between $x_1$ and $x_1+x_2$, bringing the total number of received packets to 2B at time $x_1+x_2$. The average arrival rate is therefore again determined for the time period between $x_1$ and $x_1+x_2$, leading to an average arrival rate determined as $B/x_2$. This corresponds to the level denoted by reference numeral 304 in the lower portion of the figure. The parameter B may be based on a size of one or more of the queues 208 of the buffer 206.

In the FIG. 3 embodiment, the average arrival rate determined based on packets arriving for a given time period is used to set the processor rate for a corresponding processing interval. The length of the processing interval in this example is twice the length of the time period over which the B packets were received. Initially assuming no overlap in processing intervals, and given an average arrival time computed for a time period of duration x, the processor operating rate for the next x units of time may be set to $\min(R_{max}, B/x)$. More particularly, in each interval $[\tau_j, \tau_{j+1})$ B data packets arrive, and the processor operating rate R(t) may be set in accordance with the equation $R(t)=\min\{R_{max}, B/(\tau_{j+1}-\tau_j)\}$, where as noted above $R_{max}$ denotes the minimum operating rate of the processor. As one possible alternative, the processor operating rate R(t) may be set in accordance with the equation $R(t)=\max\{R_{min}, B/(\tau_{j+1}-\tau_j)\}$, where as noted above $R_{min}$ denotes the minimum operating rate of the processor.

In the example of FIG. 3, the rate of $B/x_1$ is established for a first processing interval from $x_1$ to $2x_1$ as indicated at 302 and the rate of $B/x_2$ is established for a second processing interval from $x_1+x_2$ to $x_1+2x_2$ as indicated at 304. However, in this particular example it can be seen that the first and second processing intervals do in fact overlap with one another for a period of time from $x_1+x_2$ to $x_1+2x_2$. For this overlapped period, the operating rate of the processor is set to a combined operating rate of $B/x_1+B/x_2$. This combined operating rate corresponds to the level denoted by reference numeral 306. Thus, in the FIG. 3 embodiment, the average arrival rate is recomputed for each of a sequence of processing intervals, and adjacent ones of the processing intervals are permitted to partially overlap with one another. As indicated above, the combined rate is limited by the maximum operating rate $R_{max}$ of the processor. Accordingly, if the total combined rate exceeds $R_{max}$ then the processor operating rate is set to $R_{max}$ for as long as it needs to catch up with running the separate rates.

The batch-based rate adaptation illustrated in FIG. 3 can be advantageously combined with nearest-to-source (NTS) or farthest-to-go (FTG) scheduling in control module 210 to provide improved energy efficiency while maintaining a stable network configuration with acceptable bounds on queue length and end-to-end delay. In NTS scheduling, one of the packets that has traveled a shorter distance from its source in the network is given priority over another one of the packets that has traveled a longer distance from its source in the network. In FTG scheduling, one of the packets that has a longer distance to travel to its destination in the network is given priority over another one of the packets that has a shorter distance to travel to its destination in the network. Alternative embodiments of the invention can implement other types of scheduling algorithms in combination with the batch-based rate adaptation of FIG. 3, including, for example, FIFO scheduling. Another example of a scheduling algorithm that can be combined with rate adaptation as described herein is longest-in-system (LIS) scheduling, which gives priority to packets that have been in the network for the longest time and may therefore be regarded as a type of "global" FIFO scheduling.

Figure 4:
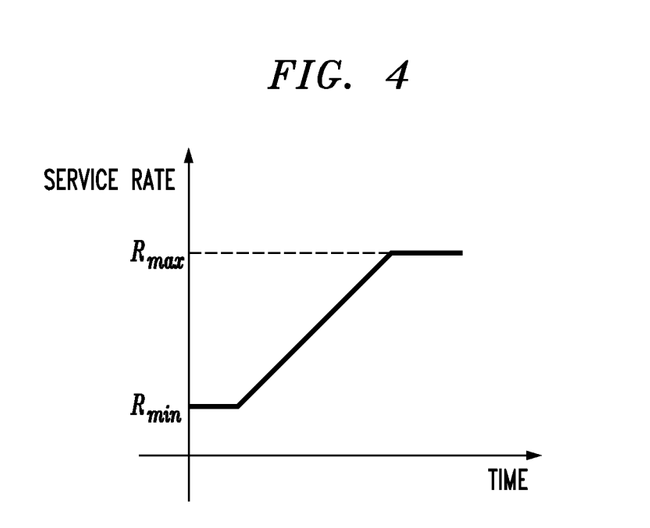

Referring now to FIG. 4, an illustrative embodiment is shown in which the operating rate of the processor 200 is controlled based on the number of packets stored in one or more of the queues 208. More particularly, in this embodiment, the operating rate of the processor 200 is controlled by determining if a given one of the queues 208 is at or below a designated minimum fullness threshold, and if the given queue is at or below the designated minimum fullness threshold, the processor operating rate is set to a first relatively low level, and subsequently increased from the first relatively low level to a second relatively high level. Such an arrangement is an example of what is also referred to herein as a slow-start rate adaptation technique.

In the particular example shown in FIG. 4, the operating rate of the processor is initially set to the minimum rate $R_{min}$ when the given one of the queues 208 is empty or otherwise below the minimum fullness threshold, and then increases linearly as a function of time until it reaches the maximum rate $R_{max}$. This assumes that the queue does not drop back below the minimum fullness threshold, in which case the rate would again be set back to the minimum rate $R_{min}$. The rate may remain at the minimum rate $R_{min}$ for a period of time given by $B/R_{min}$ and the slope of the linear increase may also be a function of B and $R_{min}$, such as $B^2/R_{min}$. The slow-start rate adaptation may be more generally expressed as setting processor operating rate R(t) in accordance with the equation R(t)=min{$R_{max}$,g(•)}, where g(•) is a piecewise linear function.

Like the batch-based rate adaptation of FIG. 3, the slow-start rate adaptation of FIG. 4 can be advantageously combined with NTS or FTG scheduling in control module 210 to provide improved energy efficiency while maintaining a stable network configuration with acceptable bounds on queue length and end-to-end delay. Again, it should be understood that other types of scheduling algorithms can be combined with the slow-start rate adaptation in the control module 210.

Figure 5:
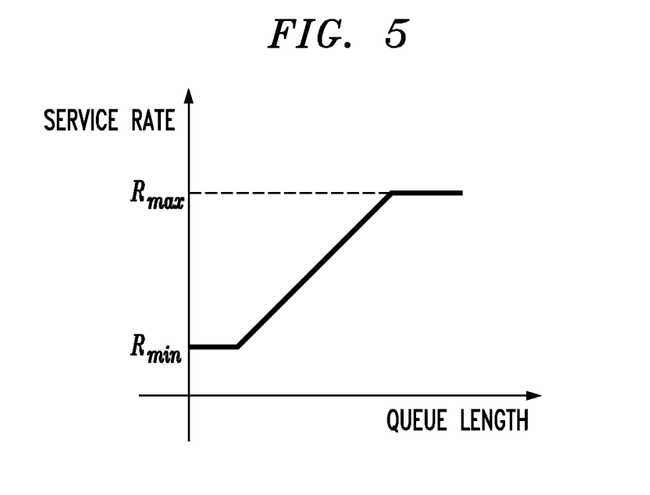

FIG. 5 shows another illustrative embodiment in which the operating rate of the processor 200 is controlled based on the number of packets stored in one or more of the queues 208. More particularly, in this embodiment, the operating rate of the processor 200 is controlled by setting the operating rate as a designated function of the number of packets stored in given one of the queues 208. Such an arrangement is an example of what is also referred to herein as a queue-based rate adaptation technique.

In the particular example shown in FIG. 5, the operating rate of the processor is initially set to the minimum rate $R_{min}$ and then increases linearly as a function of queue length until it reaches the maximum rate $R_{max}$. Although a linear function is used in this example, other types of functions can be used. For any such functions, the processor operating rate should generally be above the minimum rate and set to the maximum rate when the queue length reaches a certain threshold. The queue-based rate adaptation may be more generally expressed as setting processor operating rate R(t) in accordance with the equation R(t)=f(q(t)), where q(t) is the queue length at time t, and f(•) is a non-negative and non-decreasing continuous function. In particular, if the queue length exceeds a specified threshold U then f(q(t)) is set to the maximum rate $R_{max}$. Otherwise, f(q(t)) is at least the minimum rate $R_{min}$.

The queue-based rate adaptation illustrated in FIG. 5 can be advantageously combined with weighted fair queuing (WFQ) scheduling in control module 210 to provide improved energy efficiency while maintaining a stable network configuration with acceptable bounds on queue length and end-to-end delay. In WFQ scheduling, each traffic stream gets its share of service rate proportional to the fraction of bandwidth that the stream requires. For example, if three streams share a processor with the streams occupying ½, ⅓ and ⅙ of the total bandwidth, respectively, then the processor will give ½, ⅓ and ⅙ of its processing time to the respective streams. Thus, in combination with the queue-based rate adaptation described above, the traffic streams will get respective processing rates of R(t)/2, R(t)/3 and R(t)/6 at time t as a function of the queue length. Again, other scheduling algorithms can be combined with queue-based rate adaptation in other embodiments.

The above-described rate adaptation in the illustrative embodiments is implemented independently within each network device. It is therefore fully distributed, without any use of centralized control, although as previously indicated such an implementation is not a requirement of the present invention.

Advantageously, it can be shown that the exemplary rate adaptation techniques of FIGS. 3 through 5 when combined with appropriate scheduling algorithms such as those noted above result in energy efficient and stable network configurations in which queue length and end-to-end delay are suitably bounded.

As mentioned above, embodiments of the present invention may be implemented at least in part in the form of one or more software programs that are stored in a memory or other computer-readable storage medium of a network device or other processing device of a communication network. As an example, network device components such as the scheduler 212 and rate adaptation logic 214 may be implemented at least in part using one or more software programs.

Of course, numerous alternative arrangements of hardware, software or firmware in any combination may be utilized in implementing these and other system elements in accordance with the invention. For example, embodiments of the present invention may be implemented in one or more field-programmable gate arrays (FPGAs), application-specific integrated circuits (ASICs) or other types of integrated circuit devices, in any combination. Such integrated circuit devices, as well as portions or combinations thereof, are examples of "circuitry" as the latter term is used herein.

It should again be emphasized that the embodiments described above are for purposes of illustration only, and should not be interpreted as limiting in any way. Other embodiments may use different types of networks, device configurations, and communication media, depending on the needs of the particular application. Alternative embodiments may therefore utilize the techniques described herein in other contexts in which it is desirable to provide energy efficiency in a communication network by coordinated scheduling and processor rate adaptation. The particular rate adaptation techniques disclosed can be combined with a variety of different types of scheduling algorithms in order to produce stable network configurations with bounded queue lengths and packet delays. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising the steps of:
receiving packets in a network device of a communication network;
scheduling the packets for processing from one or more queues of the network device; and
controlling an operating rate of a processor of the network device based at least in part on at least one of an arrival rate of the packets and a number of said packets stored in said one or more queues;
wherein the controlling step further comprises:
accumulating a designated number of the received packets;
determining an average arrival rate of the accumulated packets; and
setting the operating rate of the processor based on the average arrival rate; and
wherein the step of setting the operating rate of the processor based on the average arrival rate comprises setting the processing rate for an overlapped portion of two adjacent processing intervals to a combined operating rate for the two intervals subject to a maximum operating rate of the processor.

2. The method of claim 1 wherein the accumulating, determining and setting steps are repeated for each of a sequence of processing intervals.

3. The method of claim 2 wherein adjacent ones of the processing intervals are permitted to partially overlap with one another.

4. The method of claim 1 wherein the controlling step further comprises:
    determining if at least a given one of the one or more queues is at or below a designated minimum fullness threshold;
    if the given queue is at or below the designated minimum fullness threshold, setting the processor operating rate to a first relatively low level; and
    subsequently increasing the processor operating rate from the first relatively low level to a second relatively high level.

5. The method of claim 4 wherein the first relatively low level is a minimum operating rate of the processor.

6. The method of claim 4 wherein the second relatively high level is the maximum operating rate of the processor.

7. The method of claim 4 wherein the step of increasing the processor operating rate comprising increasing the processor operating rate linearly as a function of time.

8. The method of claim 1 wherein the controlling step further comprises setting the operating rate of the processor as a designated function of the number of packets stored in the one or more queues.

9. The method of claim 8 wherein the designated function comprises a linear function.

10. The method of claim 1 wherein the step of scheduling the packets for processing further comprises scheduling the packets on a nearest-to-source basis such that one of the packets that has traveled a shorter distance from its source in the network is given priority over another one of the packets that has traveled a longer distance from its source in the network.

11. The method of claim 1 wherein the step of scheduling the packets for processing further comprises scheduling the packets on a farthest-to-go basis such that one of the packets that has a longer distance to travel to its destination in the network is given priority over another one of the packets that has a shorter distance to travel to its destination in the network.

12. The method of claim 1 wherein the step of scheduling the packets for processing further comprises scheduling the packets in accordance with a weighted fair queuing (WFQ) scheduling policy.

13. An article of manufacture comprising a non-transitory computer-readable storage medium having embodied therein executable program code that when executed by a processor of a network device causes the network device to perform the steps of:
    receiving packets in the network device of a communication network;
    scheduling the packets for processing from one or more queues of the network device; and
    controlling an operating rate of the processor of the network device based at least in part on at least one of an arrival rate of the packets and a number of said packets stored in said one or more queues;
    wherein the controlling step further comprises:
        accumulating a designated number of the received packets;
        determining an average arrival rate of the accumulated packets; and
        setting the operating rate of the processor based on the average arrival rate; and
    wherein the step of setting the operating rate of the processor based on the average arrival rate comprises setting the processing rate for an overlapped portion of two adjacent processing intervals to a combined operating rate for the two intervals subject to a maximum operating rate of the processor.

14. The article of manufacture of claim 13 wherein the controlling step further comprises:
    determining if at least a given one of the one or more queues is at or below a designated minimum fullness threshold;
    if the given queue is at or below the designated minimum fullness threshold, setting the processor operating rate to a first relatively low level; and
    subsequently increasing the processor operating rate from the first relatively low level to a second relatively high level.

15. The article of manufacture of claim 13 wherein the controlling step further comprises setting the operating rate of the processor as a designated function of the number of packets stored in the one or more queues.

16. The article of manufacture of claim 13 wherein the step of scheduling the packets for processing further comprises one or more of:
    scheduling the packets on a nearest-to-source basis such that one of the packets that has traveled a shorter distance from its source in the network is given priority over another one of the packets that has traveled a longer distance from its source in the network; and
    scheduling the packets on a farthest-to-go basis such that one of the packets that has a longer distance to travel to its destination in the network is given priority over another one of the packets that has a shorter distance to travel to its destination in the network.

17. A network device comprising:
    a processor having a controllable operating rate;
    a memory coupled to the processor and comprising one or more queues;
    network interface circuitry configured to support communication between the network device and one or more additional devices of a communication network; and
    a control module;
    wherein packets are received via the network interface circuitry and scheduled by the control module for processing from the one or more queues of the memory;
    wherein the operating rate of the processor is controlled by the control module based at least in part on at least one of an arrival rate of the packets and a number of said packets stored in said one or more queues;
    wherein the operating rate of the processor is controlled by:
        accumulating a designated number of the received packets;
        determining an average arrival rate of the accumulated packets; and
        setting the operating rate of the processor based on the average arrival rate; and
    wherein setting the operating rate of the processor based on the average arrival rate comprises setting the processing rate for an overlapped portion of two adjacent processing intervals to a combined operating rate for the two intervals subject to a maximum operating rate of the processor.

18. The network device of claim 17 wherein the operating rate of the processor is further controlled by determining if at least a given one of the one or more queues is at or below a designated minimum fullness threshold, and if the given queue is at or below the designated minimum fullness threshold, setting the processor operating rate to a first relatively low level, and subsequently increasing the processor operating rate from the first relatively low level to a second relatively high level.

19. The network device of claim 17 wherein the operating rate of the processor is further controlled by setting the operating rate of the processor as a designated function of the number of packets stored in the one or more queues.

20. The network device of claim 17 wherein the packets are scheduled for processing on one or more of:
   a nearest-to-source basis such that one of the packets that has traveled a shorter distance from its source in the network is given priority over another one of the packets that has traveled a longer distance from its source in the network;
   a farthest-to-go basis such that one of the packets that has a longer distance to travel to its destination in the network is given priority over another one of the packets that has a shorter distance to travel to its destination in the network; and
   a weighted fair queuing basis.

21. The network device of claim 17 wherein the control module comprises a combined scheduler and rate adaptation module.

22. The network device of claim 21 wherein the control module is implemented at least in part in the form of software executed by the processor.

* * * * *